Feb. 9, 1960 N. T. SAWDEY 2,923,952
TRANSFER APPARATUS IN COMBINATION THEREOF WITH MACHINES
Filed Sept. 23, 1957 2 Sheets-Sheet 2
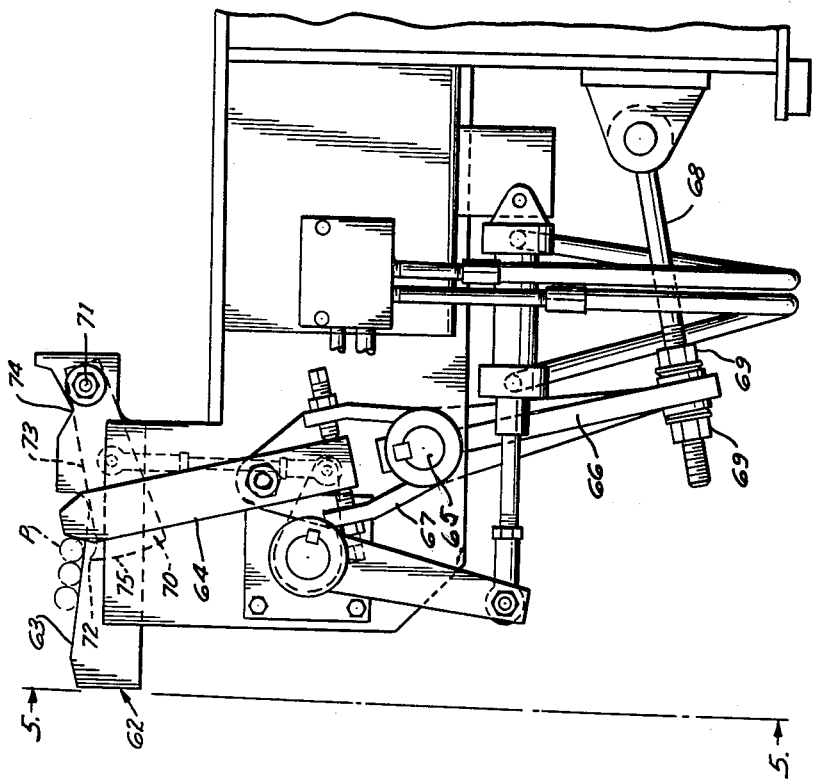
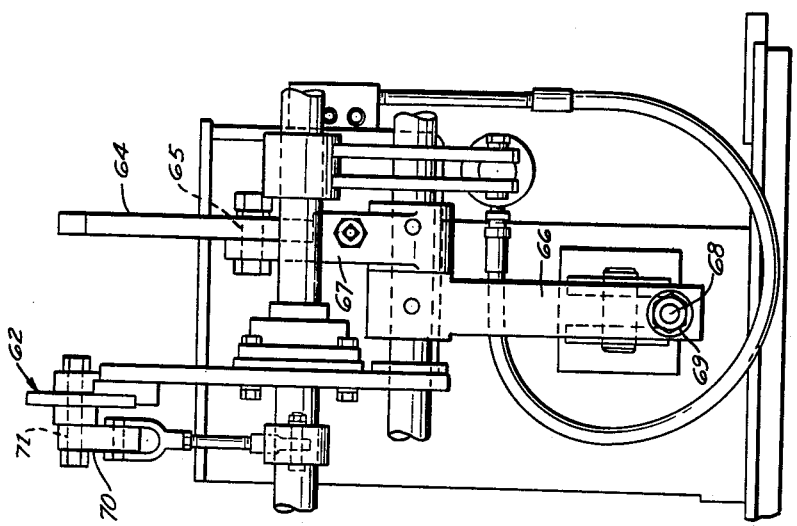
INVENTOR.
Neil T. Sawdey,
BY
John H. Leonard,
his ATTORNEY.

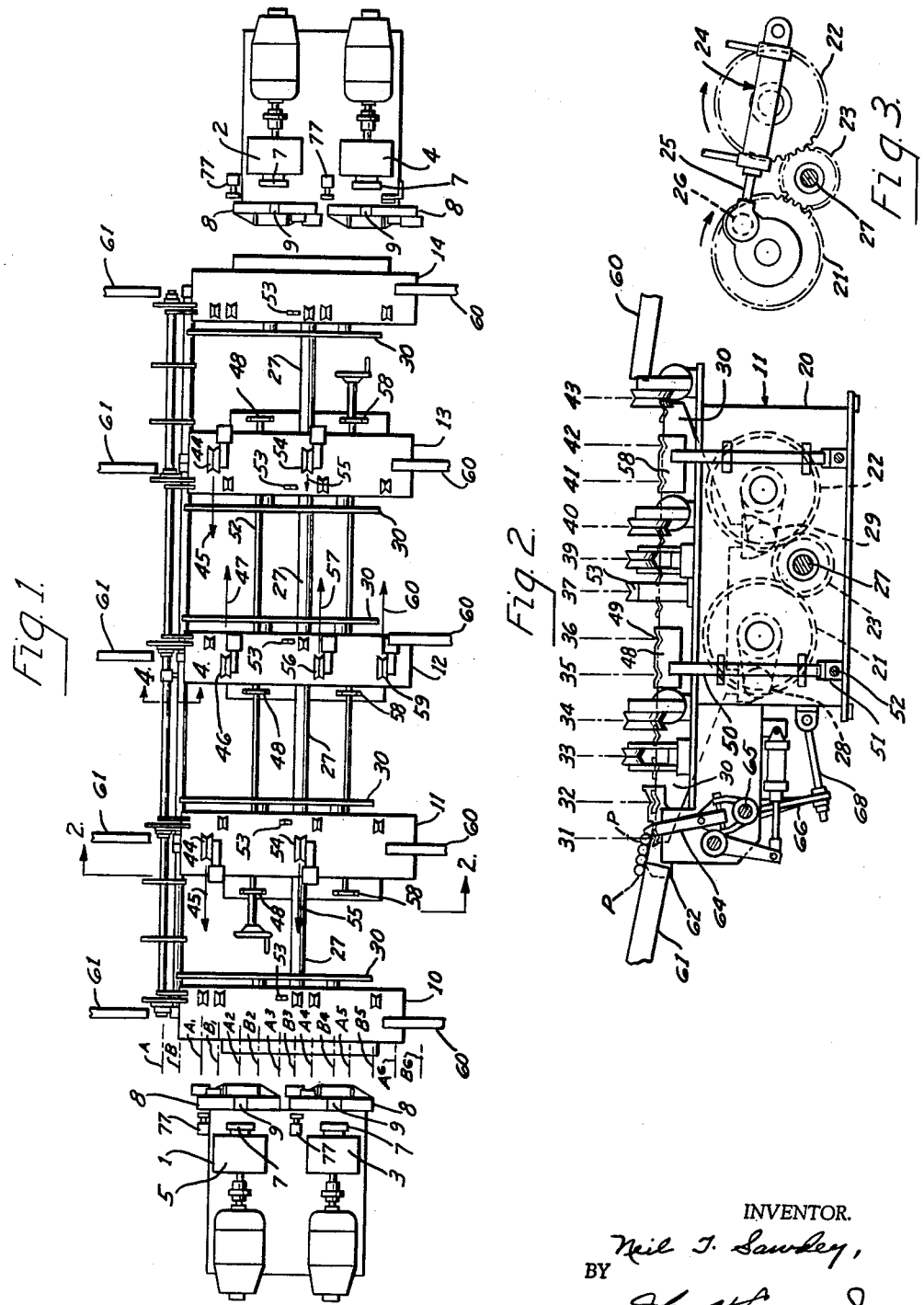

United States Patent Office 2,923,952
Patented Feb. 9, 1960

2,923,952

TRANSFER APPARATUS IN COMBINATION THEREOF WITH MACHINES

Neil T. Sawdey, Shaker Heights, Ohio, assignor to The Pipe Machinery Company, Wickliffe, Ohio, a corporation of Ohio Application September 23, 1957, Serial No. 685,650

8 Claims. (Cl. 10—107)

This invention relates to a transfer apparatus for transferring pipes, rods, bars, and the like, transversely of their lengths to different operational stations, and particularly to a transfer apparatus adapted for cooperation with a plurality of spindle machines, such as pipe cutting and threading machines, which are arranged at opposite ends of the transfer apparatus with their spindle axes parallel to each other and to the axes of the stock.

For convenience in illustration, the present invention is described herein as applied to the transfer of pipes to different operational stations for threading by rotary spindle threading machines, its use in connection with other types of machines and apparatus being readily apparent from the illustrative example.

U.S. Letters Patent No. 2,728,327, issued on December 25, 1955, to W. L. Benninghoff and John Thomson, discloses a transfer apparatus of this general character for use with two spindle machines which are arranged one at each end of the apparatus. The driving mechanism of the present apparatus is essentially the same as that disclosed in the patent, and the control system for the transfer apparatus disclosed in the patent may be used in connection with the present transfer apparatus, if desired.

The principal improvement in the present apparatus resides in the arrangement by which two pairs of pipes, or a total of four pipes, can be transferred concurrently to four machines, and thereby threaded concurrently, each at one of its ends, whereas with the patented structure, only two pipes can be transferred concurrently and threaded concurrently, each at one of its ends.

Other important improvements reside in the specific manner of feeding the pipes to the transfer device so that they can be transferred thereacross to successive stations, and in the manner of positioning them, when at the stations, so that two pipes can be threaded concurrently at one end of the apparatus while two other pipes are being threaded concurrently at the other end of the apparatus.

More specific improvements are the provision of a separating mechanism for separating the pipes as they are fed from a loading skid to the apparatus, and the arrangement of the separating mechanism so that it can be adjusted readily to accommodate itself to a wide range of pipe diameters.

Another more specific improvement resides in the manner in which the operational stations are arranged for cooperation with the transfer racks for effecting the proper transfer of the pipes by a simple circular movement of the racks when a plurality of pipes are being moved concurrently to their particular stations.

Other improvements and various advantages of the invention will become apparent from the following description, wherein reference is made to the drawings, in which:

Fig. 1 is a diagrammatic top plan view of a preferred form of transfer apparatus embodying the present invention, in combination with four concurrently operative rotary spindle threading machines;

Fig. 2 is an enlarged vertical cross sectional view of the transfer apparatus, and is taken on the lines 2—2 of Fig. 1, part thereof being shown in section for clearness in illustration;

Fig. 3 is an enlarged fragmentary view of the driving mechanism shown in Fig. 2, and is shown as a detached view for clearness in illustration;

Fig. 4 is an enlarged fragmentary cross sectional view, taken on the line 4—4 in Fig. 1; and Fig. 5 is an enlarged elevation of the structure illustrated in Fig. 4, viewed as indicated by the line 5—5 in Fig. 4.

Referring to the drawings, the transfer apparatus and the apparatus and machine combination, of the present invention, are shown as comprising a plurality of motor driven rotary spindle threading machines 1 through 4, respectively, the machines 1 and 3 being arranged at one end of the transfer apparatus, and the machines 2 and 4 at the opposite end.

Since each machine is the same in structure, only one is referred to herein in detail.

Referring to the machine 1 as exemplary, it comprises the usual motor driven transmission mechanism 5 driven by a motor 6. The machine spindle carries a retractible rotary thread cutter 7, which is arranged in cooperative relation to a suitable holding chuck 8 into the throat 9 of which the pipe to be threaded can be lowered transversely of the pipe into threading position with the adjacent end of the pipe near enough the face of the spindle so that the cutter can be advanced the necessary distance for the threading operation.

The chucks used are preferably of the type disclosed in U.S. Patent No. 2,798,234, issued July 9, 1957, and in the copending application of W. L. Benninghoff, Serial No. 685,739, filed September 23, 1957.

The rotary spindle machines are arranged in pairs, one pair at each end of the apparatus, because threading machines of this nature are relatively wide and it is not desirable to place those at the same end of the apparatus sufficiently close to each other laterally for threading the ends of two adjacent pipes. Such an arrangement would unduly increase the width of the apparatus. Instead, the threading machines for adjacent pipes are arranged at opposite ends of the apparatus so those at one end cooperate with pipes which are arranged alternately transversely of the apparatus. This arrangement permits the axes of the spindles to be placed closer together than the width of the machines and greatly reduces the width of the structure and facilitates the transfer of the lengths of pipe to the different operational stations. Thus the axes of the spindles 1 and 3 at one end of the apparatus are alternated with the axes of the spindles 2 and 4 at the other end.

The transfer apparatus comprises a plurality of stands, indicated as 10 through 14, respectively. The stands 11 and 13 are power stands, whereas the stands 10, 12 and 14 are dummy stands which are the same as the power stands except that the primary power means for operating the apparatus are not included therein, but instead are included only in the stands 11 and 13. Since the stands, with this difference, are essentially the same, only one power stand 11 is described herein in detail.

The stand 11 comprises a suitable base or frame 20, in which are rotatably mounted a pair of gears 21 and 22, which are interconnected by means of a gear 23 interposed therebetween. The gear 21 is driven by means of a piston and cylinder assemblage 24 having a piston with a rod 25, which is drivingly connected to an eccentric crank 26 on the gear 21.

As described in the above identified patent, each power stand is provided with a similar drive, and the drive of one power stand is 90 degrees out of phase with the drive of the other power stand so that the apparatus can not come to rest in a dead center position. Each assemblage 24 is operable to rotate its associated gear 21 through one complete revolution and then stop. The gear 23 is mounted on a shaft 27 which is common to the gears 23 of all of the stands so that the corresponding gears 21 and 22 of each idle stand will be driven in fixed timed relation to each other and to those of the power stands through the torque imparted to the gears 23 of the power stands by the driven gears 21 of the power stands.

Supported on eccentric cranks 28 and 29 on the gears 21 and 22, respectively, is a transfer rack 30. The axes of the cranks 28 and 29 preferably are the same distance out from the axes of the gears 21 and 22, and, in starting position, lie in a common horizontal plane. The gears 21 and 22 are of the same diameter. As a result, upon rotation of the gears 21 and 22 through one complete revolution, each point on the transfer rack describes a circular path with an axis parallel to the axes of the gears 21 and 22. The rack 30 travels in its circular path parallel to its starting position. The rack may be made to travel in other types of closed paths, if desired, but the circular path is preferred.

In the form illustrated, the gears 21 and 22 rotate in the direction indicated by the arrows in Fig. 3, which is in a clockwise direction, and the transfer rack 30 has been lifted through an arcuate path from starting position and is just entering the upper left hand quadrant, upwardly and to the right through the upper left hand quadrant, thence downwardly and to the right through the upper right hand quadrant, thence downwardly and toward the left through the lower right hand quadrant, and thence upwardly and to the left through the lower left hand quadrant to the place of beginning.

The rack 30 is substantially coextensive in width with the transfer apparatus and is arranged to receive the pipes at the feed side of the apparatus, and then, successively to lift them upwardly and to the right and lower them downwardly and to the right into different operational stations, and, upon continued operation, to pass below the level of all of the pipes to allow them to come to rest in their stations. This action is repeated each time the rack 30 makes one complete circuit through its closed circular path. Stations of the transfer apparatus are provided at each stand. Those of each stand are arranged in a row across the apparatus. The stations of each stand are aligned with corresponding stations of the other stands endwise of the apparatus.

In the form shown, the stations comprise, in sequence from the feeding side to the discharge side of the apparatus, two pickup stations 31 and 32, two positioning stations 33 and 34, two operational stations 35 and 36, a single idle rest station 37, two positioning stations 39 and 40, two operational stations 41 and 42, and a single aligning station 43.

The pickup stations are arranged so that each supports a single length of pipe in a position for picking up by the transfer rack 30, the pipes being supported for this purpose in spaced relation to each other transversely of the apparatus. The positioning stations 33 and 34 are arranged to position the pipes endwise of the apparatus, the station 33 being arranged to position a pipe for operation by the spindle 1 and the station 34 being arranged to position a pipe for operation by the spindle 2. Accordingly, the station 33 includes a plurality of power operated driving rolls 44 which are rotated, as indicated by the arrow 45, so as to drive the stock toward the spindle 1. The station 34 includes a power operated driving roll 46 which is rotated so as to drive the pipe thereon, as indicated by the arrow 47, toward the spindle 2. Suitable idler rolls are distributed along the stations as desired.

Stations 35 and 36, which are operating stations, comprise essentially a plurality of pipe rests 48, each of which, in the form illustrated, comprises a single piece of metal having notches 49 therein to accommodate the pipes in laterally spaced relation to each other. Each rest is supported on an upright post 50 which is adjustable vertically by means of a pair of complementary wedges 51, one complementary wedge being carried on the post and one on a longitudinally movable shaft or draw rod 52, so that all of the rests in a single row endwise of the apparatus can be adjusted simultaneously in height for different diameters.

The idle rest station 37 comprises stationary rests 53, inasmuch as the pipe does not change position endwise when in the idle rest station 37. The positioning station 39 includes a plurality of power driven rolls 54, which are rotated so as to drive the pipe in a direction toward the spindle 3, as indicated by the arrow 55. The positioning station 40 includes a power driven roll 56 which is rotated to drive the stock toward the spindle 4, as indicated by the arrow 57. The operating stations 41 and 42 are provided with rests 58 which essentially are the same as the rest 48 heretofore described and are adjustable in like manner.

To the extreme right of the structure, as illustrated in Fig. 2, in the aligning station 43 which includes a power driven roll 59 which is rotated to drive a length of pipe in the direction indicated by the arrow 60, which is generally toward the end of the apparatus at which the spindle 4 is located, as at this end there is also located a discharge skid 60.

In order to feed the pipe to the transfer apparatus for transfer transversely of the apparatus to the different stations, a suitable loading skid 61 is provided. The skid 61 is inclined so that the pipes, as indicated generally at P, roll down the incline toward the adjacent side of the transfer apparatus.

As better illustrated in Fig. 4, there is arranged along the left, or feeding side, of the apparatus at the various stands, some receiving rests 62, each of which has an upwardly exposed surface 63 inclined downwardly away from the skid and adapted to receive the pipes from the skid and permit them to roll transversely of their length downwardly and laterally inwardly of the apparatus toward the pickup position. Each of the rests 62 is provided with a cooperating stop arm 64 which is adjustable to different positions transversely of the apparatus for purposes which are described hereinafter.

As best illustrated in Fig. 4, each arm 64 is mounted for rocking movement transversely of the apparatus by a pivot 65, and is adjustable to different positions by means of an adjustable rocker arm 66, one end of which carries a yoke 67 which is adjustably connected with the lower end of the arm 64, and the other end of which has an eye through which extends a suitable rod 68. The arm 66 can be adjusted along the rod by means of suitable nuts 69.

A separator arm 70 is mounted by a pivot 71 on each support 62, for swinging movement about a horizontal axis of the pivot 71. The pivot 71 is inwardly of the support from the arm 64. The free end of the separator arm 70 is provided with a finger 72 which is positioned so that when a pipe is resting on the surface 63 and against the stop arm 64 in the particular adjusted position of the arm 64, the finger 72 is in the proper position to pass between the outboard side of the pipe which is resting on the surface 63 and against the stop arm 64 and the inboard side of an outwardly adjacent pipe which is resting on the surface 63 and is juxtaposed against the pipe which is resting against the arm 64.

The separator arm 70 has an upwardly exposed supporting surface 73 which extends from the finger 72 rearwardly toward the pivot 71. Near its inboard end, the support 62 is provided with a notch 74 which is adapted to receive and accommodate a pipe when a pipe rolls thereinto transversely of the apparatus. The surface 73 of the separator arm 70 extends from the finger 72 sufficiently far rearwardly, and is so arranged, that, when the separator arm 70 is swung upwardly to a predetermined distance above the location in which the finger 72 entered between two pipes, it lifts the pipe from in front of the arm 64 to an elevation such that the surface 73 slopes downwardly from the pipe toward the pivot 71. Thereupon the pipe which was formerly resting against the outboard face of the arm 64, rolls down the surface 73 into the notch 74. During this operation, the outer end surface 75 of the separator arm 70 prevents any pipes which were outwardly of the lifted pipe from rolling down against the arm 64 until the separator arm 70 has been lowered to starting position, whereupon another pipe rolls down the surface 63 into position against the arm 64.

Let it be assumed, as a starting condition, that a pipe A is at station 31 resting against the arm 64, another pipe B is in the notch 74 of the support 62, and a plurality of pipes P are resting on the loading skid and are urged by gravity downwardly toward the stop arm 64, and each station supports a pipe. Upon operation of the rack, the pipe A in pickup station 31 and the pipe B in pickup station 32, are lifted in an arcuate path upwardly and to the right and then lowered downwardly and to the right until the pipe A is deposited on the rolls 44 and pipe B on the rolls 46 of the positioning stations 33 and 34, respectively. Immediately, the pipe A is moved toward the spindle 1, and the pipe B is moved toward the spindle 2, until they strike the stops 77 of the spindles 1 and 2, respectively. These stops are arranged in all instances so that when the end of a pipe is abutting the stop, the pipe is in proper position to enter the chuck 9 of the particular spindle with which it is to be associated at the next station in proper position for threading. The rolls may be controlled or timed with relation to the driving of the rack 30 so that they are stopped prior to the movement of the rack to lift the pipes A and B from the rolls 44 and 46. Thus, at the end of the first complete cycle of the rack 30, the pipes A and B are in their first positioning stations, indicated by the designations $A_1$ and $B_1$, and have been moved endwise to proper position against the stops 77.

In the next cycle of the rack, the pipes $A_1$ and $B_1$, without any change in their positions endwise from their endwise positions in the stations 33 and 34, are transported in arcuate paths upwardly from the stations 33 and 34 and then downwardly and to the right, and deposited in the notches 49 of the rests 48 of the operating stations 35 and 36. Accordingly, the pipes are now in positions $A_2$ and $B_2$ wherein they are in the throats 9 of the chucks 8. Therefore, the pipe in position $A_2$ is in position for operation by the spindle 1 and the pipe in position $B_2$ is in position for operation by the spindle 2. Thereupon, the pipes are clamped by the chucks 9 and the threading operation is effected by the spindle 1 on one end of the pipe in position $A_2$ and by the spindle 2 on the opposite end of the pipe in position $B_2$.

When these threading operations are completed, the rack is again operated through a complete cycle and lifts the pipes from the positions $A_2$ and $B_2$ in the operating stations 35 and 36 upwardly and to the right and thence downwardly. On the downward movement of the rack, the pipe $A_2$ is deposited in position $A_3$ on the stationary rest 53 of the idle rest station 37, and the pipe $B_2$ is moved to the position $B_3$ on the power driven rolls 54 of the positioning station 39, which rolls immediately move the pipe in position $B_3$ toward the spindle 3 until it strikes the stop 77 thereof. Meanwhile, the pipe in position $A_3$ has not changed its position endwise.

After the pipe in position $B_3$ has been moved to the stop of the spindle 3, the rack is again operated through a complete cycle whereupon the pipe in position $A_3$ is lifted from the idle rest station 37 and moved to position $A_4$ in the positioning station 40 where it is deposited on the rolls 56 and driven thereby toward, and against the stop 77 of, the spindle 4. Concurrently, the pipe in position $B_3$ is carried from its positioning station 39, at which it was already positioned endwise against the stop 77 of the spindle 3, to the position $B_4$ in the operating station 41 with the pipe in the proper endwise position for operation by spindle 3.

After threading by the spindle 3 is completed, the rack operates through another complete cycle whereupon the pipe which had been in position $B_4$ in the operating station 41 is lifted upwardly and to the right and then lowered and deposited in position $B_5$ on the driven rolls 59 of the aligning station 43. The rolls 59 are driven so as to drive the pipe endwise in a direction toward the spindle 4 which is adjacent to the discharge skid 60 so that the pipe will be in position for discharge onto the skid 60. At the same time, the pipe in the position $A_4$ in the station 40 is moved into position $A_5$ in the operating station 42 in which it is threaded by the spindle 4, having already been moved to the proper end of the apparatus.

Upon the next complete cycle of the rack 30, the pipes A and B are lifted upwardly and to the right and deposited on the skid in positions $A_6$ and $B_6$, respectively, and thus discharged.

It is apparent that the pipe at the position $A_2$ is threaded at one end by spindle 1, and the pipe at position $B_2$ is threaded at the opposite end by spindle 2, and the pipe in position $B_4$ which has been threaded at one end by spindle 2 is moved up and threaded at its opposite end by spindle 3, and the pipe in position $A_5$ which has been threaded at one end by spindle 1 is moved down and threaded at the opposite end by spindle 4.

It is apparent that, by this arrangement, a larger number of pipes can be handled effectively with the spindles operating at full capacity, and with a minimum of floor space.

The timing and driving of the apparatus, spindles, and the like, may be in accordance with the teachings of Patent No. 2,728,327, above cited, the lengths of dwell of the pipes in any station depending upon the particular requirements of the threading or cutting operations, and the timing of the driven rolls depending upon the lengths of the pipe and the time required for the threading operation, due to the various lengths of the threaded portions, and the like.

The aligning station 43 is very desirable in those instances in which there is a considerable variation in the lengths of pipes. However, if a large number of pipes which are to be operated on are of substantially the same length as each other, and are loaded on the rack with their corresponding ends substantially coplanar with each other, then the aligning station is unnecessary.

Having thus described my invention, I claim:

1. A transfer apparatus comprising a plurality of stands arranged in alignment in a row extending endwise of the apparatus, transfer racks respective to the stands, means for driving the racks unidirectionally concurrently in closed generally upright paths while maintaining them in alignment with each other endwise of the row, workpiece stations spaced from each other laterally of the row and including, in succession, from one side of the row toward the other, a first pickup station and a second pickup station, feed means to pre-position two lengths of stock, one in each of said pickup stations, said feed means including supports arranged in a row extending endwise of said apparatus, said first pickup station being adapted to receive a length of stock sidewise of the stock, when the length of stock is caused to roll sideways along a supporting surface toward the first pickup station, stop means to arrest the sidewise movement of said length of stock in predetermined position on the first pickup station, separator elements associated with the supports and movable concurrently upwardly and downwardly relative thereto along predetermined aligned paths, said elements each having a separating finger positioned to pass, upon raising the associated element, between the outboard side of a first length of stock which is in said first pickup station and the inboard side of a second length of stock which is juxtaposed against the outboard side of the first length and is lying on said supporting surface, said elements being operable concurrently to lift the first length of stock clear of the first pickup station and move it onto the second pickup station while blocking the entry of the second length onto the first pickup station, as the element is raised, and to move out of blocking relation to the entry of the second length onto the first pickup station when the element is lowered, and power means to operate the feed means.

2. The structure according to claim 1 characterized in that said stop means is adjustable in a direction transversely of the apparatus whereby lengths of stock of different diameter can be stopped in position for separation by the said fingers.

3. The structure according to claim 1 characterized in that each separator element comprises an arm pivotally mounted on the support inwardly, transversely of the apparatus, from said first pickup station for swinging upwardly and downwardly about an axis extending endwise of the apparatus, the outer end of the arm normally is disposed outwardly beyond the first pickup station, the finger is on the outer end of the arm, the arm has an upwardly exposed lifting surface at its outer end adapted to engage the underside of a length of stock on the first pickup station and lift it therefrom as the arm is swung upwardly, and has an upwardly exposed skid surface which, when the arm is in raised position, slopes downwardly inwardly transversely of the apparatus in a position such that the lifted length will roll off of the lifting surface and down the skid surface onto the second pickup station.

4. A transfer apparatus comprising a plurality of stands arranged in alignment in a row extending endwise of the apparatus, transfer racks respective to the stands, means for driving the racks unidirectionally concurrently in closed generally upright paths while maintaining them in alignment with each other endwise of the row, workpiece stations spaced from each other laterally of the row and including, in sequence from one side of the row to the other, first and second pickup stations including supports on which pipes are placed initially and supported side by side in horizontal position preparatory to feeding by the racks, first and second positioning stations including driving means engageable with the pipes when the pipes are in said stations for driving the pipes endwise in opposite directions, respectively, to positions for operating thereon, first and second operating stations wherein operations are performed on the pipes at one end of each, a single idle rest station, third and fourth positioning stations located to receive pipes originally in the second and first position stations, respectively, and including driving means engageable with the received pipes for driving the pipes endwise in the opposite directions, respectively, from those in which they were driven in the second and first positioning stations, to position for operating thereon, a third and fourth operating station wherein operations are performed on the pipes at the other end of each, a discharge rack, feed means to preposition two lengths of stock in said pickup stations, respectively, and said path being one wherein the rack rises at the side of its path nearer the pickup stations and travels upwardly transversely and then downwardly transversely as it moves from said side toward the last stations, means on the rack to engage the underside of pipes in said stations, respectively, and to lift the pipes clear of their respective stations as the rack rises, and, as the rack continues along said path, to lower and deposit the pipes in other of the stations in the direction of transfer.

5. The apparatus according to claim 4 characterized in that the first and second positioning stations are above the level of the pickup stations, the first and second operating stations are below the level of the positioning stations, the idle rest station and the third and fourth positioning stations are above the level of the first and second operating stations, the third and fourth operating stations are below the level of the idle rest station and the third and fourth positioning stations, and the aligning station and discharge rack are above the level of the third and fourth operating stations.

6. A transfer apparatus according to claim 4 characterized in that an aligning station is provided between the other stations and the discharge rack, and stops are provided at the aligning station and positioning means are provided for the aligning station and are operative to drive the stock endwise in a predetermined direction.

7. A transfer apparatus and spindle tool combination comprising a plurality of stands arranged in alignment in a row extending endwise of the apparatus, transfer racks respective to the stands, means for driving the racks unidirectionally concurrently in closed paths while maintaining them in alignment with each other endwise of the row, workpiece stations spaced from each other laterally of the row and including, in sequence from one side of the row to the other, first and second pickup stations including supports on which pipes are placed initially and supported side by side in horizontal position preparatory to feeding by the racks, first and second positioning stations in which the pipes are moved to predetermined positions endwise, first and second operating stations in which the pipes are operated on at one end of each, a single idle rest station, third and fourth positioning stations in which the pipes are moved to other predetermined positions endwise, a third and fourth operating station in which the pipes are operated on at the other end of each, a discharge rack, feed means to preposition two lengths of stock to be transferred in said pickup stations, respectively, sets of positioning drive means for the positioning stations, respectively, the sets of drive means for the first and third positioning stations being operative to drive the stock endwise in one direction, and the sets of positioning drive means for the second and fourth positioning stations being operative to drive the stock endwise in the opposite direction, and stops at the positioning stations, respectively, for arresting endwise movement of the stock by the positioning drive means in preselected positions, pairs of spindle machines at the ends of the apparatus, respectively, the spindles at one end being in operating alignment with the first and third operating stations, respectively, and the spindles at the other end being in operating alignment with the second and fourth operating stations, respectively.

8. A transfer apparatus according to claim 7 characterized in that an aligning station is provided between the other stations and the discharge rack, and stops are provided at the aligning station and positioning means are provided for the aligning station and are operative to drive the stock endwise in a predetermined direction.

References Cited in the file of this patent

UNITED STATES PATENTS

| | | |
|---|---|---|
| 2,688,144 | Berkey et al. | Sept. 7, 1954 |
| 2,728,327 | Benninghoff et al. | Dec. 27, 1955 |